United States Patent [19]

Marquisee et al.

[11] 3,954,666

[45] May 4, 1976

[54] SEMIPERMEABLE MICROCAPSULES CONTAINING HETEROGENEOUS CATALYSTS AND FERROMAGNETIC MATERIALS

[75] Inventors: Mark James Marquisee, Wilmington; William W. Prichard, Hockessin, both of Del.

[73] Assignee: E. I. Du Pont de Nemours and Company, Wilmington, Del.

[22] Filed: July 11, 1974

[21] Appl. No.: 487,815

[52] U.S. Cl............................ 252/430; 252/472; 252/477 R; 428/402; 428/407
[51] Int. Cl.² ................ B01J 23/42; B01J 23/44; B01J 23/74; B01J 31/08
[58] Field of Search............ 252/477 R, 62.53, 430, 252/472, 62.54; 161/DIG. 5

[56] References Cited

UNITED STATES PATENTS

| | | | |
|---|---|---|---|
| 2,886,513 | 5/1959 | Baker.............................. | 252/461 X |
| 2,971,916 | 2/1961 | Schleicher et al. ............... | 252/62.53 |
| 3,041,289 | 6/1962 | Katchen et al................ | 252/62.53 X |
| 3,661,620 | 5/1972 | Dekking et al. ............... | 161/DIG. 5 |

*Primary Examiner*—W. J. Shine

[57] ABSTRACT

Described are semipermeable microcapsules which comprise an outer semipermeable polymeric skin encapsulating a finely divided heterogeneous catalyst and a ferromagnetic material. The microcapsules are useful as magnetic, heterogeneous catalysts.

9 Claims, No Drawings

SEMIPERMEABLE MICROCAPSULES CONTAINING HETEROGENEOUS CATALYSTS AND FERROMAGNETIC MATERIALS

BACKGROUND OF THE INVENTION

1. Field of the Invention

This invention relates to semipermeable microcapsules containing a heterogeneous catalyst and a ferromagnetic material.

2. Description of the Prior Art

The immobilization of enzymes (homogeneous catalysts) by encapsulation within permanent, semipermeable microcapsules was first reported by Chang (Science, Volume 146, p. 524, 1964) who employed interfacial polycondensation to prepare polyamide membranes containing various enzymes. In subsequent work a number of enzymes have been encapsulated within semipermeable membranes.

Although the incorporation of ferromagnetic material within pressure-rupturable, nonpermeable microcapsules is well known (U.S. Pat. No. 2,971,916), the incorporation of such material within a semipermeable microcapsule has been studied to only a limited extent. Chang (Trans. Amer. Soc. Artif. Int. Organs, XII, 13, 1966) incorporated iron powder and an enzyme within a semipermeable nylon microcapsule which was to be used in an extracorporeal shunt system. The microcapsule was made by suspending the iron in a hemolysate-alkaline-diamine solution before microencapsulation. A tendency for lysis of such microcapsules prevented their successful use.

SUMMARY OF THE INVENTION

The present invention comprises semipermeable microcapsules which comprise an outer semipermeable polymeric skin encapsulating a finely divided heterogeneous catalyst and a ferromagnetic material. It was not known heretofore to encapsulate a heterogeneous catalyst within a semipermeable microcapsule.

DETAILED DESCRIPTION OF THE INVENTION

The invention comprises the encapsulation within a semipermeable membrane of a heterogeneous catalyst, and a ferromagnetic material. Optionally, a cell stabilizing agent may be present. The resulting capsules are stable when suspended in an aqueous or nonaqueous phase, the catalyst is active for effecting a desired catalytic reaction, and the capsules can be captured and released from the solvent phase by means of a magnetic field.

The catalyst suitable for encapsulation in the microcapsules of this invention are finely divided, heterogeneous catalysts. The term "heterogeneous catalyst" is used herein to refer to catalysts which are insoluble in the reaction medium in which they function as catalysts. These catalysts are generally solids. Suitable heterogeneous catalysts include any insoluble catalyst which functions at temperatures below the melting point of the capsule walls. Catalysts employed for hydrogenation, e.g., nickel, palladium, platinum, ruthenium and rhodium; catalysts suitable for olefin isomerization, e.g., platinum, palladium and rhodium; oxidation catalysts, e.g., platinum and cobalt oxides; catalysts suitable for hydrosilylation of olefins such as palladium; and ion exchange resins including acidic types containing active groups such as carboxylic or sulfonic acid groups, for example, styrene-acrylic acid resins, and basic types, for example, those containing tertiary amine groups, may be successfully encapsulated. The preferred catalysts are those suitable for hydrogenation of olefins. The heterogeneous catalyst is encapsulated by being suspended in the phase that will end up inside the capsule.

The heterogeneous catalyst may also be formed in situ within the microcapsule by dissolving a soluble precursor of a heterogeneous catalyst in the medium which will end up inside the capsule. The capsule is then post-treated to convert the catalyst precursor to the insoluble catalyst. For example, a soluble metal salt may be dissolved in the medium during preparation of the capsule. The capsule is then treated with an agent which will permeate into the capsule and reduce the metal salt to the free metal.

Another method of forming the catalyst in situ is to form the capsule without any heterogeneous catalyst component present, impregnate the capsule with a soluble heterogeneous catalyst precursor which will migrate into the capsule through the semipermeable skin, isolate the capsule, and treat it with a reagent which will convert the precursor to the catalyst.

Incorpoation of finely divided ferromagnetic material into the microcapsules permits ready retrieval of the capsules from the reaction medium by application of a magnetic force external to the capsules. By "ferromagnetic material" is meant any substance which is attracted by a magnet. Although any ferromagnetic powder with a particle size less than 1 micron is suitable for use in the invention, acicular iron, $Fe_3O_4$, iron powder, "Alnico", nickel, cobalt, and $CrO_2$ are preferred. Ferromagnetic powders of particle size less than about 0.25 micron are preferred. A ferromagnetic liquid such as Ferrofluid (Ferrofluidics Corp.) may also be used. The ferromagnetic material should be selected based on compatibility with the particular heterogeneous catalyst to be encapsulated.

The semipermeable microcapsules may be prepared by interfacial polycondensation, or by other well known microencapsulation techniques such as interfacial coacervation. Suitable polymers include condensation polymers formed by interfacial polycondensation as well as other polymers formed by interfacial coacervation such as polystyrene, collodion, ethylcellulose and cellulose acetate butyrate. Interfacial polycondensation is the preferred technique.

When the microcapsule is prepared by interfacial polycondensation, the capsule skin may be composed of any condensation polymer, e.g., polyamide, polyurethane, polysulfonamide, polyurea, polyester, polycarbonate, etc. Polyamides prepared by interfacial polycondensation of an amine with an acid chloride are preferred. The process of preparing microcapsules by interfacial polycondensation will be described hereinafter using polyamides as an example of the condensation polymer. Microcapsule skins can be formed from other condensation polymers in a similar manner.

In the preparation of polyamide microcapsule skins an amine is reacted with an acid chloride by interfacial polycondensation. Suitable amines include any aliphatic or aromatic amine capable of undergoing interfacial polycondensation. Preferred are such aliphatic amines or their salts as hexamethylenediamine, ethylenediamine, piperazine, 2,5-dimethylpiperazine, 3-aminopentamethylenediamine, diethyleneamine, 1,10-decamethylenediamine, polyethyleneimine, and aromatic amines or their salts such as m-phenylenediamine, p-phenylenediamine, 1,2,4-triaminobenzene, 1,2,4,5-tetraaminobenzene, and 4,4′-diamino-2,2′-biphenyldisulfonic acid. The amine components are normally employed as a 0.4–2.0 molar aqueous solution.

Acid chlorides suitable for use in the preparation of a polyamide skin include both aromatic and aliphatic acid chlorides capable of undergoing interfacial polycondensation. Preferred are acid chlorides obtained from such aliphatic acids as adipic acid, sebacic acid and dodecanedioic acid, and aromatic acids such as phthalic acid, isophthalic acid, terephthalic acid, trimesic acid, trimellitic acid, naphthalenedicarboxylic acids, bis(4-carboxyphenyl)methane, and bis(4-carboxycyclohexyl)methane.

The acid chloride components are normally employed as a 0.001–1.0 molar solution in the nonwater-miscible organic solvent. Suitable solvents include aliphatic, cycloaliphatic and aromatic hydrocarbons and halogen-substituted hydrocarbons and include cyclohexane, chloroform, 1,1,2-trichloro-1,2,2-trifluoroethane, mineral oil, benzene, toluene, chlorobenzene, and mixtures thereof. Silicone oil is also suitable.

In preparing the microcapsules it is necessary that a surfactant or emulsifying agent be present either in the aqueous or organic phase. Suitable emulsifying agents include polyvinyl alcohol, soaps, long chain sulfonic acids and sulfates, lyophilic colloids, and neutral lyophilic fatty acid esters.

The microcapsules of this invention can be water filled, solvent filled, or silica gel filled. The type of microcapsule chosen will depend upon the reaction medium in which the microcapsule is to be used. In the case of water filled microcapsules, a cell stabilizing agent is preferably present. One type of cell stabilizing agent is an osmoticum, that is, a material which is soluble in the medium within the cell and is too large to migrate out of the semipermeable membrane. These osmotica function by causing osmotic pressure to build up within the microcapsule.

Suitable osmotica include synthetic and natural polymers as well as other materials. Suitable natural polymers include proteins, starches, acacia, natural gums, and alginates. Suitable synthetic polymers include various cellulose derivatives including cellulose ether, ethyl hydroxyethylcellulose, hydroxyethylcellulose, hydroxypropylcellulose, sodium carboxymethylcellulose, and sodium cellulose sulfate; acrylates including polyacrylic acid and its salts, polyacrylamide, acrylamide copolymers and polymethacrylic acid and its salts; and miscellaneous synthetic polymers including polyethylene glycols, polypropylene glycols, polyethylene oxide, polyvinyl alcohol, polyvinyl methyl ether, polyvinylpyrrolidine, the alkali salt of polyvinylsulfuric acid, and polyethyleneimine. Polyethyleneimine and its salts may serve as both a component of the membrane and as an osmoticum. Preferably the osmoticum is nonproteinaceous.

It is also possible to employ a silica gel as the cell stabilizing agent. By "silica gel" is meant a jelly to amorphous solid which is basically $SiO_2 \cdot nH_2O$ and which can contain small amounts of other ingredients such as, e.g., $Na_2O$. Microcapsules stabilized with silica gel are preferably prepared by incorporating a colloidal dispersion of silica or a silica-containing solution directly into the microcapsule during the encapsulation process. Alternatively, the microcapsule may be prepared by encapsulation of an appropriate silicate ester, e.g., tetraethyl orthosilicate, with subsequent hydrolysis of the encapsulated ester to form a silica gel. Hydrolysis is preferably carried out with aqueous hydrochloric acid. Incorporation of a silica gel into the capsule may also be accomplished by post-treatment of a microcapsule with a silicate ester which will migrate into the microcapsule followed by hydrolysis of the encapsulated ester to form a silica gel. The use of a silica gel as cell stabilizing agent increases the rigidity and reduces the resistance to flow of the capsules.

In the general procedure for preparing the microcapsules of this invention by interfacial polycondensation the finely divided heterogeneous catalyst and the ferromagnetic material are dispersed in a small volume of an aqueous solution containing a suitable amine or amine salt which can participate in the formation of a polyamide, and optionally a cell stabilizing agent. A suitable organic solvent or solvent mixture containing a surface active agent is added to the aqueous suspension and the mixture is emulsified. The vigor of emulsification and the concentration of surface active agent in the organic solvent will largely determine the diameter of the microcapsule. After the desired droplet size is achieved, additional organic solvent containing a suitable acid chloride which can participate in the formation of the polyamide is added. Interfacial polymerization is allowed to proceed until the reaction is completed, normally for about 1–30 minutes. When the microcapsule is to be solvent filled, the heterogeneous catalyst and ferromagnetic material are usually dispersed in the organic solution of the acid chloride.

The preparation of semipermeable microcapsules by other techniques such as coacervation is well known. In the coacervation technique, a polymer is dissolved in a solvent which is a non-solvent for the medium which will end up inside the capsule. A substance is added which causes "salting out" of the polymer at the interface with droplets of the medium which will end up inside. This technique is described in more detail by Luzzi in *Jour. Pharm. Sci.*, vol. 59, No. 10, pp 1367–1376 (October 1970) and by Zaborsky in *Immobilized Enzymes*, Chapter 7, CRC Press, division of Chemical Rubber CO., Cleveland, Ohio (1973).

The capsules can be harvested by sedimentation in a gravitational, centrifugal or magnetic field. The supernatant liquid is discarded and the remaining capsules are dispersed in a concentrated (20–100%) solution of a water-soluble detergent. Water-soluble nonionic detergents such as sorbitan monolaurate may be utilized. The capsule-detergent dispersion is diluted with water or a water-miscible organic solvent and the microcapsules are isolated by sedimentation. The resulting capsules are washed by repeated suspension in and sedimentation from fresh portions of water, a suitable aqueous solution, or an organic solvent.

The microcapsules generally have sizes of about 0.5 to 300 microns. Since the size of the microcapsules can be controlled during their preparation, the specific size prepared will depend upon the intended use of the microcapsule. Preferably the microcapsules have sizes of about 1–200 microns.

The novel microcapsules of this invention are useful in a wide variety of chemical reactions involving heterogeneous catalysts. The reaction medium permeates into the capsule, contacts the catalyst, undergoes reaction, and the product passes out of the capsule.

The presence of the magnetic particle in the capsule with the heterogeneous catalyst allows a greater degree of control over the catalyst. For example, the catalyst can be made to stay in one place or it can be moved from one place to another by means of a magnet. Typical mechanical operations which can be simplified using the magnetic capsules of this invention include magnetic stirring of the catalyst, holding the catalyst in place during decanting, or removing the catalyst from a vessel, etc. The microcapsules of this invention also provide a means of controlling the rate of reaction. When the suspended microcapsules are caused to gather together by placing the reactor in a magnetic field, the reaction rate is slowed down.

EXAMPLES OF THE INVENTION

The following examples, illustrating the novel microcapsules of this invention and methods of their preparation, are given without any intention that the invention be limited thereto. All percentages are by weight.

EXAMPLE 1

A mixture of 0.15 g of platinum oxide and 0.3 g of finely divided iron particles was homogenized, by sonication, in 10 ml of chlorobenzene. This was mixed with a solution of 1.0 g of sebacyl chloride plus 0.2 g of trimesoyl chloride in 15 ml of chlorobenzene. An equal volume (25 ml) of a 0.5% aqueous solution of polyvinyl alcohol (Elvanol 50–42) was added and the mixture was emulsified by rapid stirring for 1 minute. A 15-ml portion of a solution made from 24.3 g of 1,6-hexamethylenediamine and 20 g of sodium carbonate in 130 ml of water was then added and stirring was continued for 15 minutes.

The solvent filled capsules formed were spherical and each appeared to contain solid particles of iron and platinum oxide. The capsules were isolated by retaining them on the bottom of the glass vessel with a strong magnet while decanting the supernatant aqueous phase. They were washed with ethanol in this way and finally isolated from alcohol suspension by immersion of an electromagnet in the liquid and removal of the capsules containing the ferromagnetic iron particles. The packed volume of capsules, held in the bottom of a glass vessel while the supernatant alcohol was sucked off, was 40 ml. These were transferred to a Parr hydrogenation vessel, 10 g of styrene was added, the vessel was evacuated and pressured with 40 psi of hydrogen and shaken vigorously. A rapid uptake of hydrogen was noted, and hydrogen uptake ceased after 50 minutes. The product was analyzed by gas chromatography [1/8 inch × 5 foot column of 5% polyethylene glycol (Carbowax 20 M) on 60–80 mesh diatomite support, programmed from 40°C at 10°/minute]. A large ethylbenzene peak was observed, and styrene was not detected.

The capsules were held in the bottom of the hydrogenation vessel while the supernatant was decanted. The capsules were washed with alcohol, and then 10 g of styrene was added and the hydrogenation restarted. Hydrogen uptake was rapid, but somewhat slower than in the original test. Fifty percent of the styrene was reduced in 2 hours and 10 minutes.

EXAMPLE 2

A mixture of 0.1 g of platinum oxide, 0.5 g of iron powder, 0.1 ml of N,N,N', N'-tetramethylethylenediamine, 0.3 ml of 3-amino-1,5-pentamethylenediamine and 10 ml of aqueous colloidal sol containing 30% of $SiO_2$ (Ludox SM-30 colloidal silica) was homogenized by sonication for 1 minute. This suspension was emulsified by vigorous stirring with 30 ml of a 1:4 by volume chloroform-cyclohexane solution containing 0.3 g of sorbitan trioleate (Span 85) for 1 minute. A solution of 0.35 g of trimesoyl chloride in 30 ml of 1:4 chloroform-cyclohexane was added and stirring was continued for 15 minutes. The silica gel filled capsules formed were recovered by centrifugation, and the packed lower layer of capsules was suspended in 10 ml of a 50% solution of sorbitan monolaurate (Tween 20) in water. The capsules were again centrifuged, taken up in 30 ml of 85% alcohol, centrifuged, taken up in 30 ml of absolute ethanol, centrifuged and taken up in 30 ml of diethyl ether. The capsules were removed from the ether suspension with an electromagnet and dried at 100°C. The semipermeable microcapsules were obtained as a free-flowing black powder, weight 3.74 g.

A 1 g aliquot of the dry capsules was used for hydrogenation of 20 g of styrene in 25 ml of ethanol. After 3 hours, hydrogenation was complete as indicated by the absence of a styrene peak by gas chromatographic analysis. The capsules were centrifuged, washed with ethanol and isolated magnetically from alcoholic suspension. They were resuspended in 20 g of styrene and 25 ml of ethanol and shaken with hydrogen. In 1.75 hours, reduction was 64.5% complete. The capsules were reisolated in the same manner and reused again. A 93% reduction was effected in 3.75 hours. Thus, the catalyst was still active after three reductions.

EXAMPLE 3

Silica-filled semipermeable microcapsules were prepared by the procedure of Example 2 by replacing the iron powder and platinum oxide with 0.5 g of $CrO_2$. A 2 g aliquot of the capsules was impregnated with a saturated solution of $Ni(OCOCH_3)_2 \cdot 4H_2O$ in 95% ethanol, washed with tetrahydrofuran and then with ether, and dried at 100°C. The weight gain was 0.5 g. A 1.0 g aliquot of the capsules was treated with 5 ml of 0.5M sodium borohydride solution in 95% ethanol to effect reduction of the nickel salt to metallic nickel and the resulting capsules were agitated with 5 g of octene-1 and 5 g of octene-2 (cis-trans isomers) under 40 psi hydrogen pressure. After 30 minutes the product composition, as determined by gas chromatographic analysis on an ester-amide column at 40°C. and 50 ml of helium/minute, was 46% n-octane, 3.0% octene-1 and 51% mixed cis/trans-octene-2. Thus, a catalyst active for hydrogenation of $\alpha$-olefins, but not $\beta$-olefins, has been formed within the capsules.

EXAMPLE 4

A 0.5 g aliquot of $SiO_2$-filled capsules containing $CrO_2$, prepared as in Example 3, was impregnated with 2 ml of a dimethylformamide solution containing 0.1 g of $(C_5H_4N)_4RhCl_2$, prepared according to Jour. Catalysis, Vol. 24, p 536 (1972). The excess solution was evaporated and a solution of $NaBH_4$ in dimethylformamide was passed through the capsules to effect formation of an active metallic rhodium catalyst. The capsules were used to reduce 2.5 g of norbornadiene in 20 ml of dimethylformamide solution. Hydrogen uptake ceased after 30 minutes of shaking. The capsules were isolated from the solution with a magnet and returned to a fresh solution of norbornadiene in dimethylformamide. Reduction started immediately on repressuring with hydrogen and shaking. When gas uptake ceased, the reduction was stopped, the capsules were isolated and reduction was repeated. After four such hydrogenations, the catalyst was still active. A gas chromatographic analysis of the reduction products showed only traces of norbornadiene remaining in the solutions.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

What is claimed is:

1. A semipermeable microcapsule which comprises an outer semipermeable polymeric skin encapsulating (1) a finely divided solid heterogeneous catalyst selected from the group consisting of nickel, palladium, platinum, ruthenium, rhodium, platinum oxide, cobalt oxide and ion exchange resins and (2) a ferromagnetic material dispersed in a medium selected from the group consisting of water and organic solvents, said polymeric skin being permeable to said medium.

2. The semipermeable microcapsule of claim 1 in which the polymeric skin is a condensation polymer formed by interfacial polycondensation.

3. The semipermeable microcapsule of claim 2 in which the condensation polymer is a polyamide.

4. The semipermeable microcapsule of claim 3 in which the heterogeneous catalyst is a hydrogenation catalyst.

5. The semipermeable microcapsule of claim 3 in which the ferromagnetic material is powdered iron having a particle size of less than 1 micron.

6. The semipermeable microcapsule of claim 5 in which the heterogeneous catalyst is a hydrogenation catalyst.

7. The semipermeable microcapsule of claim 6 in which the hydrogenation catalyst is platinum oxide.

8. The semipermeable microcapsule of claim 2 in which the outer skin is filled with water containing an osmoticum.

9. The semipermeable microcapsule of claim 2 in which the outer skin is filled with organic solvent.

* * * * *

UNITED STATES PATENT OFFICE
CERTIFICATE OF CORRECTION

PATENT NO. : 3,954,666
DATED : May 4, 1976
INVENTOR(S) : Mark James Marquisee and William W. Prichard It is certified that error appears in the above-identified patent and that said Letters Patent are hereby corrected as shown below:

Column 1, line 52, "catalyst" should read --catalysts--.

Column 2, line 66, "diethyleneamine" should read --diethylenetriamine--.

Signed and Sealed this

Nineteenth Day of October 1976

[SEAL]

Attest:

RUTH C. MASON
Attesting Officer

C. MARSHALL DANN
Commissioner of Patents and Trademarks